United States Patent
Ariemma et al.

(10) Patent No.: US 9,061,627 B2
(45) Date of Patent: Jun. 23, 2015

(54) TAILGATE SENSOR

(71) Applicant: JO-MAR OF OHIO, LLC, Chesterland, OH (US)

(72) Inventors: Joseph Ariemma, Chesterland, OH (US); Mark Ange, Gates Mills, OH (US)

(73) Assignee: JO-MAR OF OHIO, LLC, Chesterland, OH (US)

( * ) Notice: Subject to any disclaimer, the term of this patent is extended or adjusted under 35 U.S.C. 154(b) by 0 days.

(21) Appl. No.: 13/838,189

(22) Filed: Mar. 15, 2013

(65) Prior Publication Data

US 2013/0321141 A1   Dec. 5, 2013

Related U.S. Application Data

(60) Provisional application No. 61/655,127, filed on Jun. 4, 2012, provisional application No. 61/691,421, filed on Aug. 21, 2012.

(51) Int. Cl.
*B60Q 1/00* (2006.01)
*B60Q 9/00* (2006.01)

(52) U.S. Cl.
CPC ..................... *B60Q 9/00* (2013.01)

(58) Field of Classification Search
CPC ......... B60Q 7/02; B60Q 9/00; B62D 33/0273
USPC ......... 340/457, 438, 540, 539.1, 686.1, 686.6
See application file for complete search history.

(56) References Cited

U.S. PATENT DOCUMENTS

| | | | | |
|---|---|---|---|---|
| 5,557,510 | A * | 9/1996 | McIntyre et al. | 700/17 |
| 6,137,419 | A * | 10/2000 | Lennox et al. | 340/457 |
| 6,727,806 | B1 * | 4/2004 | Massie et al. | 340/426.24 |
| 7,088,045 | B1 * | 8/2006 | Zich | 307/9.1 |
| 7,128,019 | B2 * | 10/2006 | Hensel | 116/35 R |
| 7,389,739 | B1 * | 6/2008 | Smith | 116/28 R |
| 7,400,971 | B2 * | 7/2008 | Robertson | 701/1 |
| 8,410,921 | B1 | 4/2013 | Lewis | |
| 2011/0128102 | A1 * | 6/2011 | Pfeiffer et al. | 335/206 |

OTHER PUBLICATIONS

Duncan Motor Sports, Duncan Engineering, LLC, Tailgate Alarm product description, 2 pgs. printed from the world-wide-web on Apr. 3, 2014.

* cited by examiner

*Primary Examiner* — Thomas Mullen
(74) *Attorney, Agent, or Firm* — Calfee, Halter & Griswold LLP

(57) ABSTRACT

A tailgate sensor system for providing a warning signal to a driver of a pickup truck when the tailgate is not in a closed position. The tailgate sensor system includes a detector mounted on an exterior of a pickup truck, an activator mounted on and moveable with a tailgate of the pickup truck, and a signal generator in communication with the detector. The detector is positioned relative a range of motion of the activator such that a signal is generator by the detector and received by the signal generator when the tailgate is in at least a partially open position. Upon receipt of the signal, the signal generator generates a warning signal to the driver.

16 Claims, 15 Drawing Sheets

Figure 1

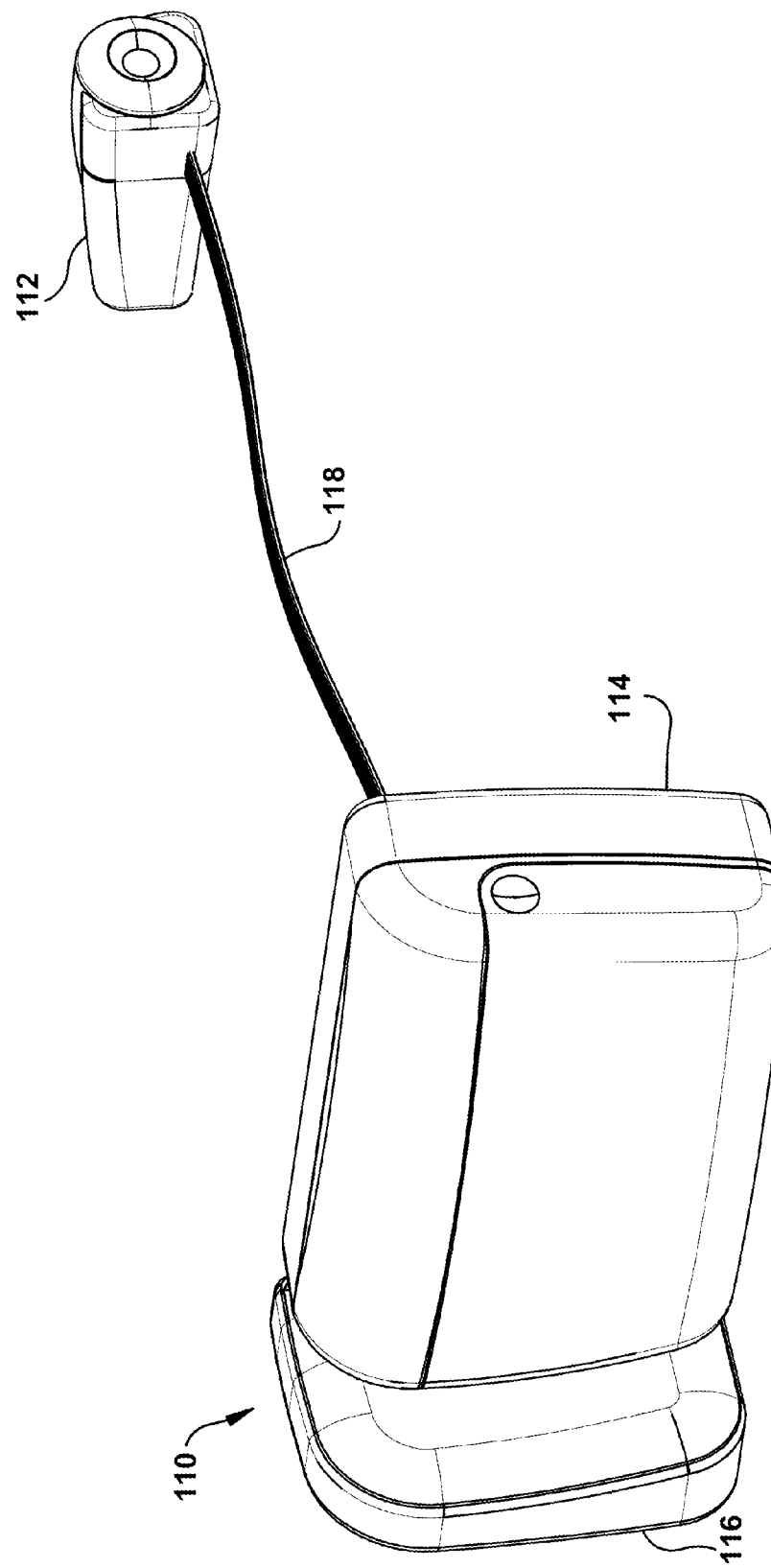

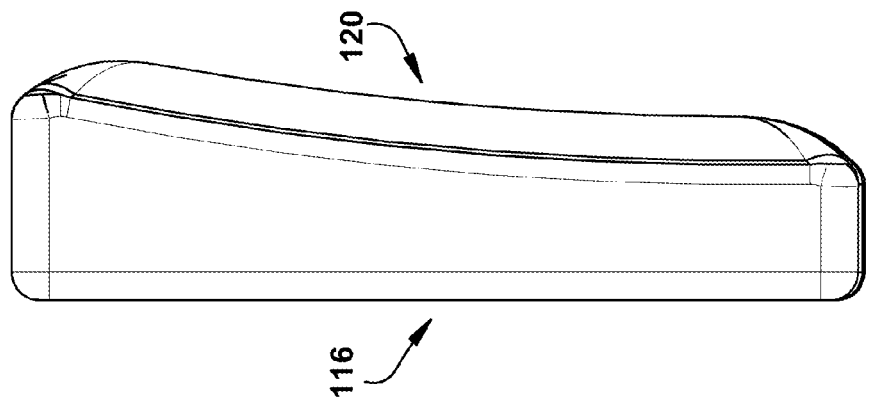
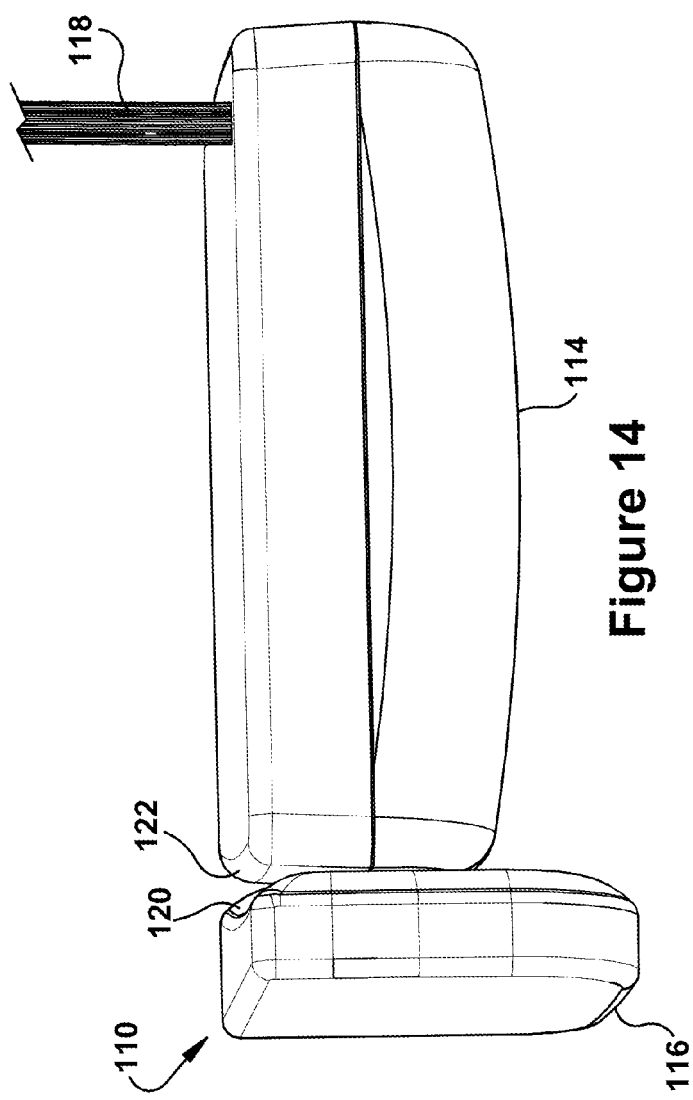

TAILGATE SENSOR

CROSS-REFERENCE TO RELATED APPLICATION

This application claims the benefit of and priority to U.S. Provisional Patent Application Ser. No. 61/655,127, entitled TAILGATE SENSOR and filed Jun. 4, 2012, and U.S. Provisional Patent Application Ser. No. 61/691,421, entitled TRUCK BED COVER SENSOR and filed Aug. 21, 2012, the entire disclosure of each is incorporated herein by reference, to the extent that either is not conflicting with the present application.

BACKGROUND

Pickup trucks are very popular vehicles and have many uses for commercial, recreational and personal purposes. A standard pickup truck includes a cab in which a driver and one or more passengers may sit and a rear bed into which items may be stored. The bed is partially defined by two vertical side rails and a tailgate which may be lowered so that larger or heavier items can be more easily placed into the bed. A typical tailgate manually rotates down to an open position and up to a closed position. However, a driver may occasionally forget to close the tailgate after loading the items into the bed.

A pickup truck includes mirrors, such as for example, a rear mounted center mirror and one or more side mirrors mounted on either side of truck near the cab. The mirrors which permit the driver to have certain lines of sight behind the pickup truck. However, the mirrors do not typically provide an adequate view of the tailgate sufficient for the driver to ascertain if the tailgate is open or closed. This characteristic of a pickup truck can be adversely magnified if the bed is loaded high with material or if the bed is covered, such as for example, by a cover extending across the bed and between the top of the side rails. If the driver inadvertently operates the pickup truck with the tailgate down, unsecured contents of the bed may slide out onto the road and be lost or damaged, or create a hazard to vehicles traveling behind the pickup truck.

SUMMARY

The present application describes a tailgate sensor system and assembly for providing an alert system to a driver is disclosed.

In an exemplary embodiment, the tailgate sensor system includes a detector, an activator and a signal generator. The detector is attached to a pickup truck. The activator is mounted on and moveable with a tailgate of the pickup truck. The signal generator is in communication with the detector. When the tailgate is in at least a partially open position, the signal generator generates a warning signal to the driver.

Further features and advantages of the invention will become apparent from the following detailed description made with reference to the accompanying drawings.

BRIEF DESCRIPTION OF THE DRAWINGS

Features and advantages of the general inventive concepts will become apparent from the following detailed description made with reference to the accompanying drawings.

FIG. 13 is a front perspective view of a tailgate sensor assembly, showing another exemplary embodiment of the invention;

FIG. 14 is a top view of the tailgate sensor assembly of FIG. 13;

FIG. 15 is a top view of a battery assembly of the tailgate sensor assembly of FIG. 13;

DETAILED DESCRIPTION

Figure 1:
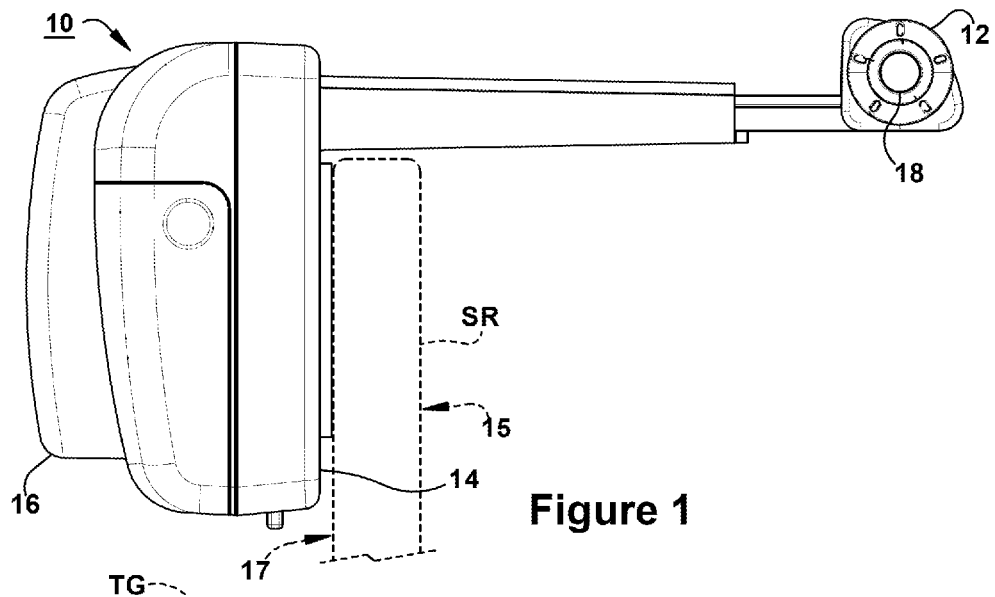
FIG. 1 is a front view of a tailgate sensor assembly, showing an exemplary embodiment of the invention.

This Detailed Description merely describes exemplary embodiments in accordance with the general inventive concepts and is not intended to limit the scope of the invention or the claims in any way. Indeed, the invention as described by the claims is broader than and unlimited by the exemplary embodiments set forth herein, and the terms used in the claims have their full ordinary meaning.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts.

A system and assembly for detecting if a tailgate of a pickup truck is open is disclosed. The system provides a signal to the driver of a pickup truck if the tailgate is not in a closed position, i.e., if the tailgate is in a partially open position or is in a fully open position. The system does not provide a signal if the tailgate is in a closed position. The signal may be a warning signal, such as for example, a visual signal within a line of sight of the driver, or an audible signal for the driver. An exemplary visual signal may be communicated to the driver from a location at or near the rear of the truck, at a location on the driver side of the truck bed, and at a location viewable by the driver by use of the driver side mirror.

In an exemplary embodiment, the tailgate sensor system includes a detector mounted on an exterior of a pickup truck, an activator mounted on and moveable with a tailgate of the pickup truck, and a signal generator in communication with the detector. The detector is positioned relative a range of motion of the activator such that a signal is generated by the detector and received by the signal generator, and the signal generator thereby generates a warning signal to the driver, when the tailgate is in at least a partially open position. The activator may act to complete an electrical circuit in the detector when the tailgate is in a closed position, and the electrical circuit in the detector is open when the tailgate is in at least a partially open position. The detector communicates an electrical signal to the signal generator when the tailgate is in at least a partially open position.

Referring now to the drawings, several exemplary embodiments of the invention will now be discussed. An exemplary embodiment of the invention is illustrated in FIGS. 1-15 for discussion purposes only. The invention is not limited to the embodiments illustrated in FIGS. 1-15, or any other embodiment discussed in the specification.

Figure 2:
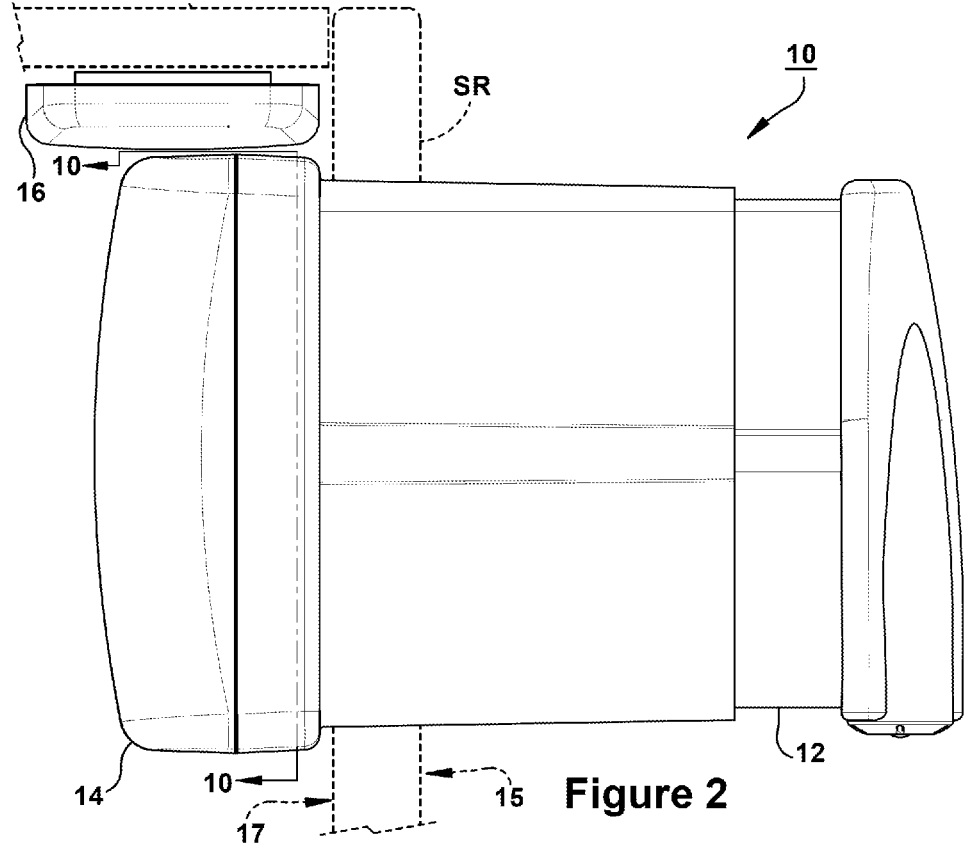
FIG. 2 is a top view of the tailgate sensor assembly of FIG. 1.

FIG. 1 is a front view of an exemplary embodiment of the invention. A tailgate sensor system 10 includes signal generator, or LED assembly 12, a detector, or sensor assembly 14, and an activator, or magnet assembly 16. FIG. 2 is a top view of the tailgate sensor assembly 10. As shown in FIGS. 1 and 2, the LED assembly 12 and sensor assembly 14 are joined, and positioned at the upper inside wall of a side rail SR on the driver's side of the pickup truck. Specifically, the sensor assembly 14 is attached to an inside surface 17 of the upper wall of a side rail SR. The magnet assembly 16 is positioned at the upper inside wall of a tailgate TG on the driver's side of the pickup truck (see FIG. 2). The LED assembly 12 includes a LED 18 which illuminates a visual signal, such as for example, a red light, when the tailgate is not in a closed position. The LED assembly is positioned at installation such that the LED is positioned outside an outside surface 15 of the side rail SR, and in the line of sight of a driver looking into the driver's side mirror of the pickup truck. It should be apparent to one skilled in the art that the warning signal to the driver may take on other forms, such as for example, the LED may be a different color, the LED may flash, or an alternative or supplemental light may be included in the cab of the pickup truck. An alternative or supplemental warning signal may be generated by a signal generator in the cab which is hard wired to the detector, or by a signal generator which is in wireless communication with the detector.

In another exemplary embodiment, the warning signal may be audible. For example, an audible device in the cab may produce a warning beeping sound when the tailgate is not in a closed position. The audible device may communicate with the rear mounted device by a radio frequency signal. It should be apparent to one skilled in the art that the warning signal to the driver may take on more than one form, and may take on more than one location, such as for example, a solid red visual signal at the rear of the truck and a flashing white visual signal within the cab of the truck, or a solid red visual signal at the rear of the truck and a siren-like audible signal within the cab of the truck.

Figure 3:
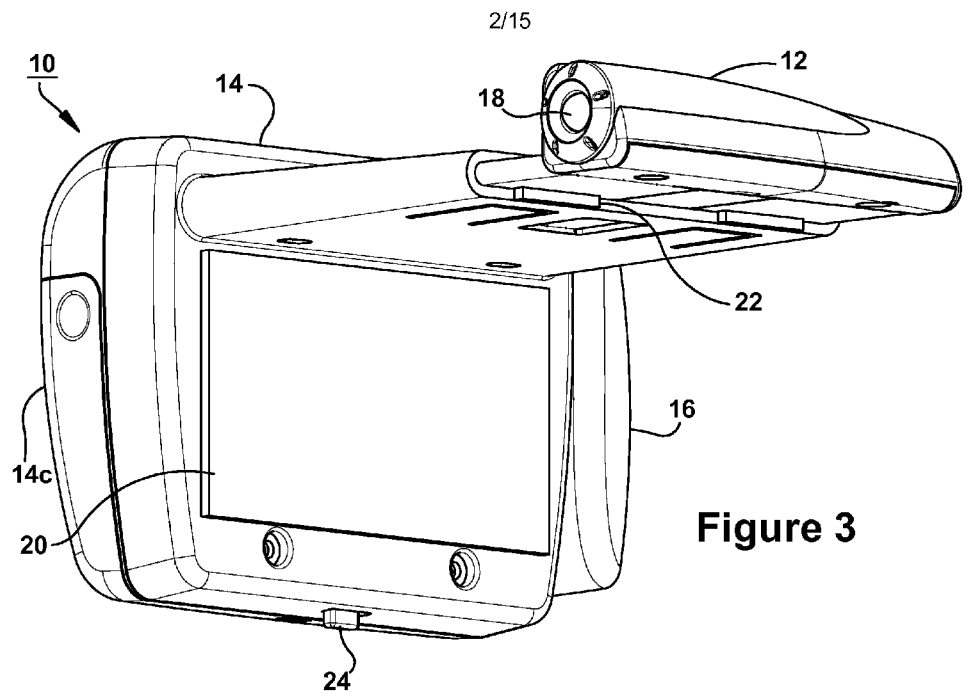
FIG. 3 is a front perspective view of the tailgate sensor assembly of FIG. 1.
Figure 4:
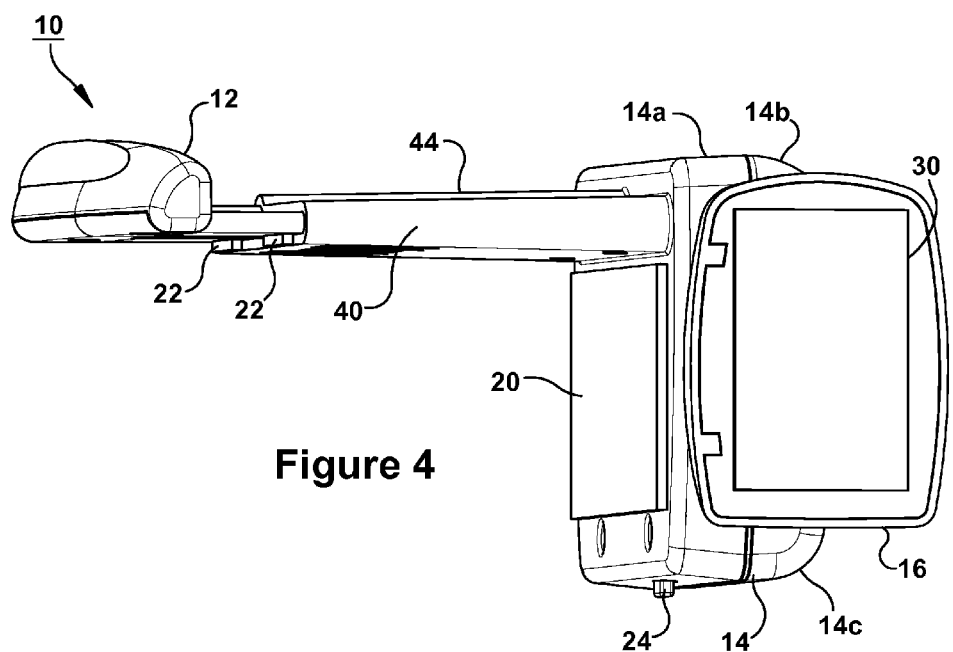
FIG. 4 is a rear perspective view of the tailgate sensor assembly of FIG. 1.
Figure 5:
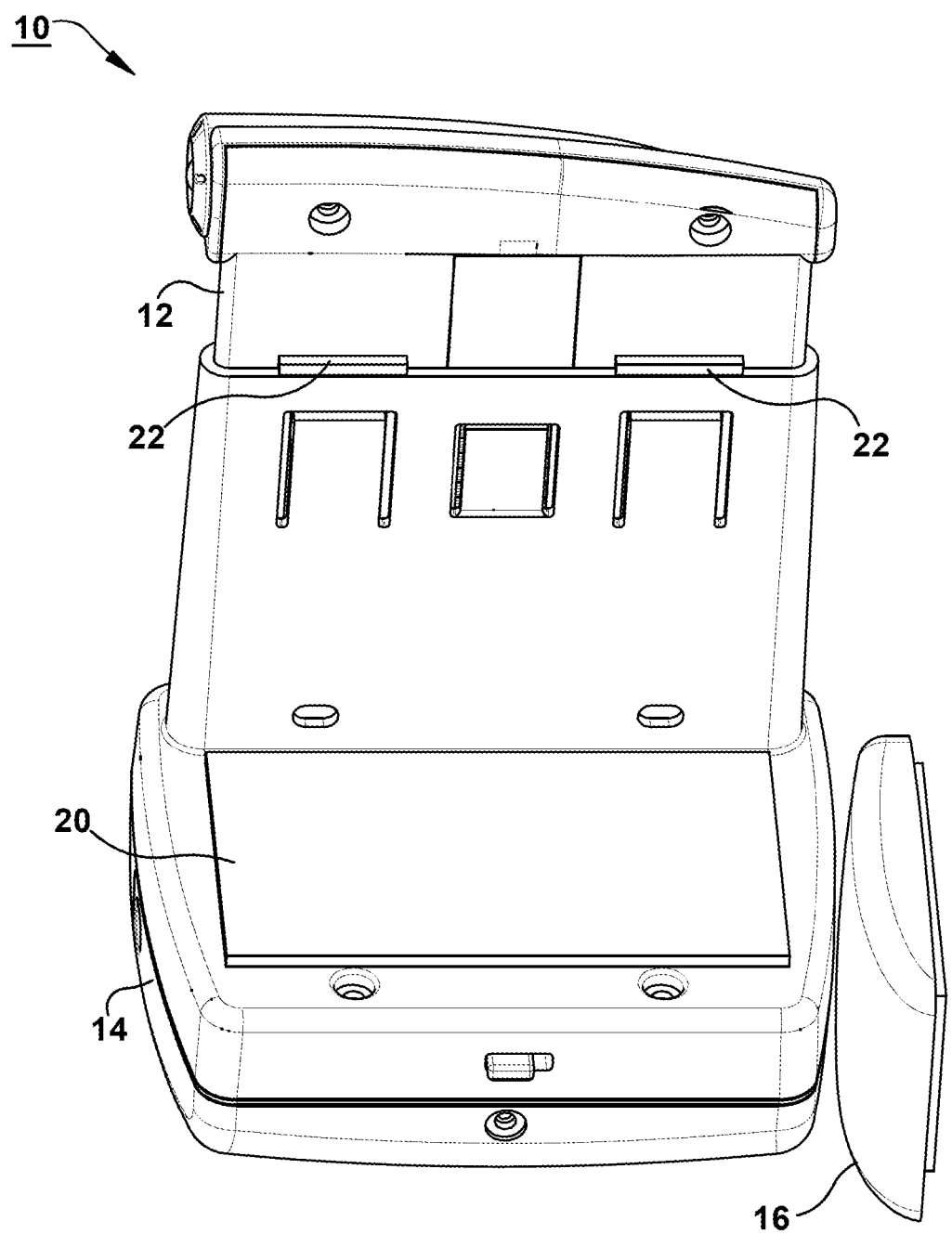
FIG. 5 is a bottom perspective view of the tailgate sensor assembly of FIG. 1.

Front, rear and bottom perspective views of the tailgate sensor assembly 12 are illustrated in FIGS. 3-5. Many features of the system are illustrated in FIG. 3, including but not limited to, an adhesive pad 20 for installing the sensor assembly 14 to the inside of the side rail, stop rails 22 to limit insertion of the LED assembly in a direction toward the sensor assembly 14, and a handle 24 used as a manual on/off switch for the assembly 12. Internal components of the sensor assembly 14 are protected by a bottom housing 14a, a top housing 14b and a battery housing 14c. An adhesive pad 30 for installing the magnet assembly 16 to the inside of the tailgate is shown in FIG. 4. FIG. 5 illustrates the proximity of the sensor assembly 14 and the magnet assembly 16 when the tailgate is in a closed position and no signal is generated by the LED assembly 12. It should be apparent to one skilled in the art that in the practice of the invention, the sensor assembly 14 may be contiguous with the magnet assembly 16 when the tailgate is in a closed position. Further, it should be apparent to one skilled in the art that the illustrated and discussed external features of the tailgate sensor system 10 may vary in the practice of the invention in size, location and orientation.

Figure 6:
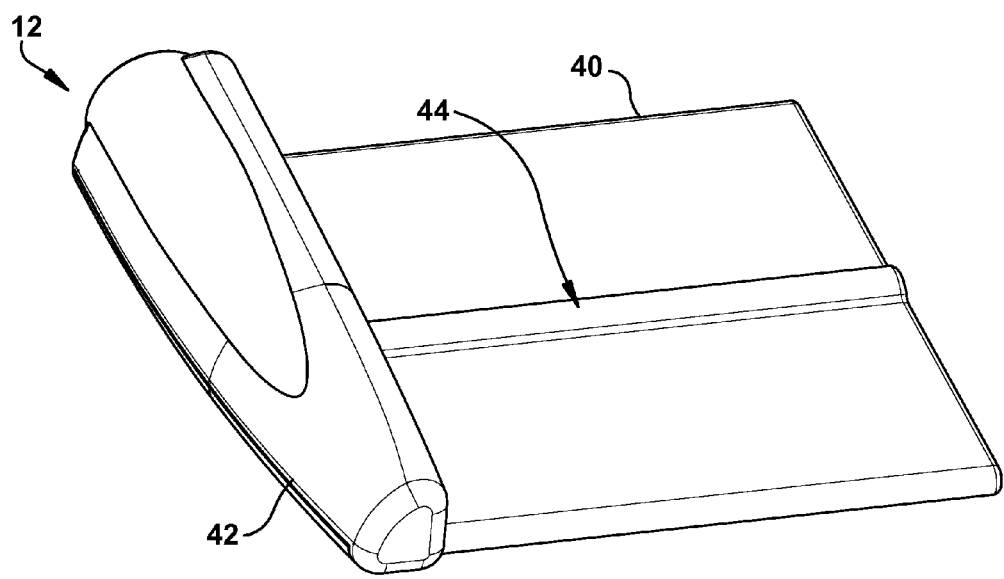
FIG. 6 is a top perspective view of an LED assembly of the tailgate sensor assembly of FIG. 1.
Figure 7:
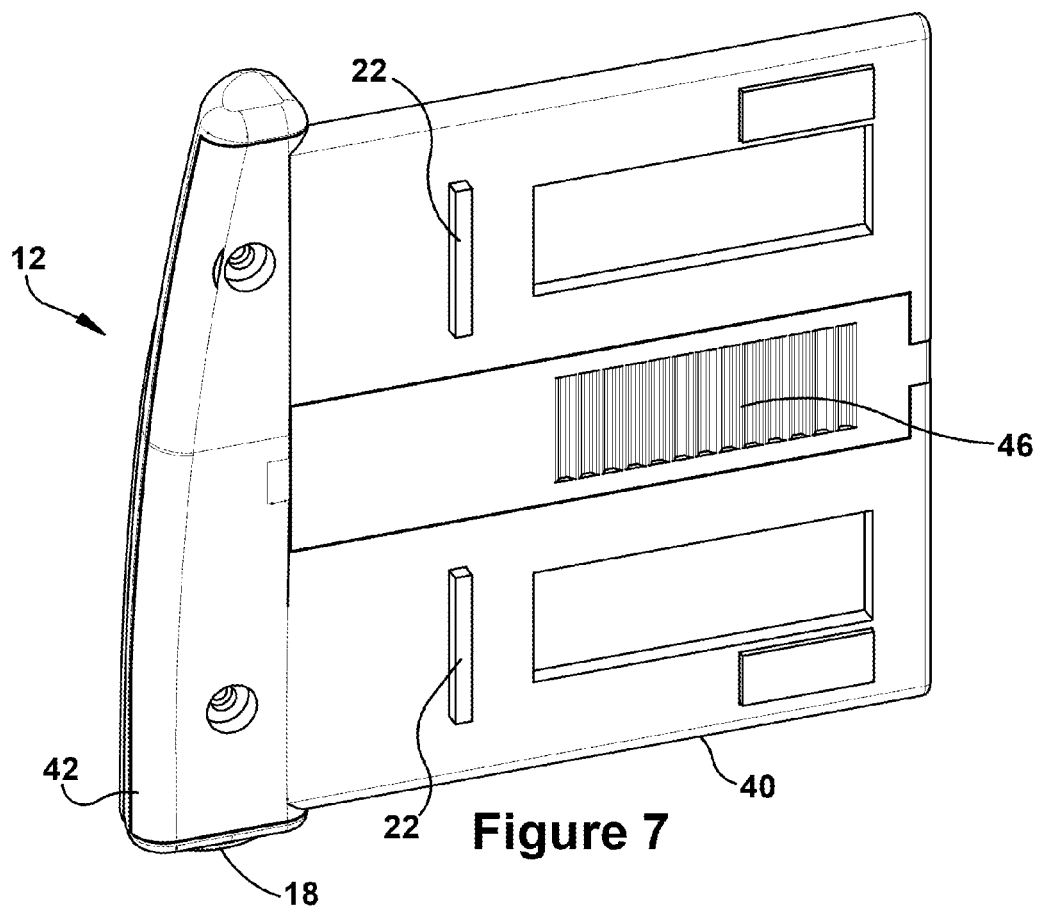
FIG. 7 is a bottom perspective view of the LED of the tailgate sensor assembly of FIG. 1.

The individual assemblies of the tailgate sensor assembly will now be discussed. FIGS. 6 and 7 are top and bottom perspective views, respectively, of the LED assembly 12. The LED assembly 12 includes a housing 40 and an LED portion 42. A wire housing 44 protects one or more wires leading from the sensor assembly 14 to the LED portion 42. On the underside of the housing 40, a series of notches 46 are visible for mating with the sensor assembly 14 during insertion. It should be apparent to one skilled in the art that the LED assembly 12 and sensor assembly 14 may be joined by any other suitable arrangement, and alternatively, may be one piece.

Figures 8, 9:
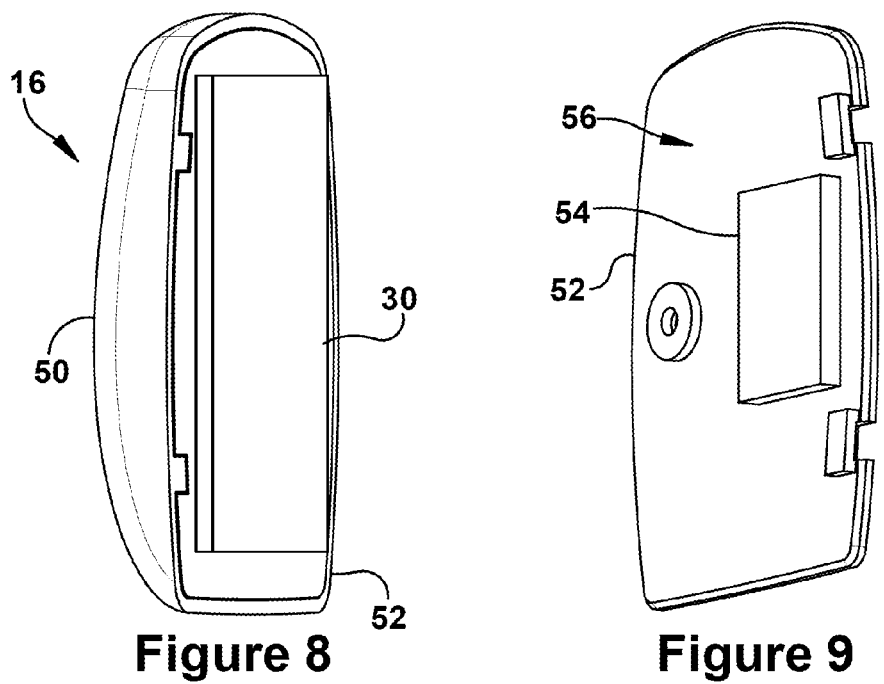
FIG. 8 is a rear perspective view of a battery assembly of the tailgate sensor assembly of FIG. 1.
FIG. 9 is a front perspective view of a portion of the battery assembly of FIG. 8, shown with a magnet removed.

A rear perspective view of a battery assembly 16 is shown in FIG. 8. A shell-shaped magnet box 50 is joined with a flat magnet cover 52. As discussed, an adhesive pad 30 on the outside surface of the magnet cover 52 is used for positioning the battery assembly 16 onto a tailgate. A front perspective view of the battery assembly 16 is shown in FIG. 9, with the battery box 50 removed. As shown in FIG. 9, with the magnet box removed, the magnet 54 is secured to the inside surface 56 of the magnet cover 52 at a location to promote magnetic interaction with one or more components of the sensor assembly 14 when in proximity of the sensor assembly 14. It should be apparent to one skilled in the art that the structure of the magnet assembly may vary in the practice of the invention. For example, the size, shape, number and location of the magnet may vary in the practice of the invention.

Figure 10:
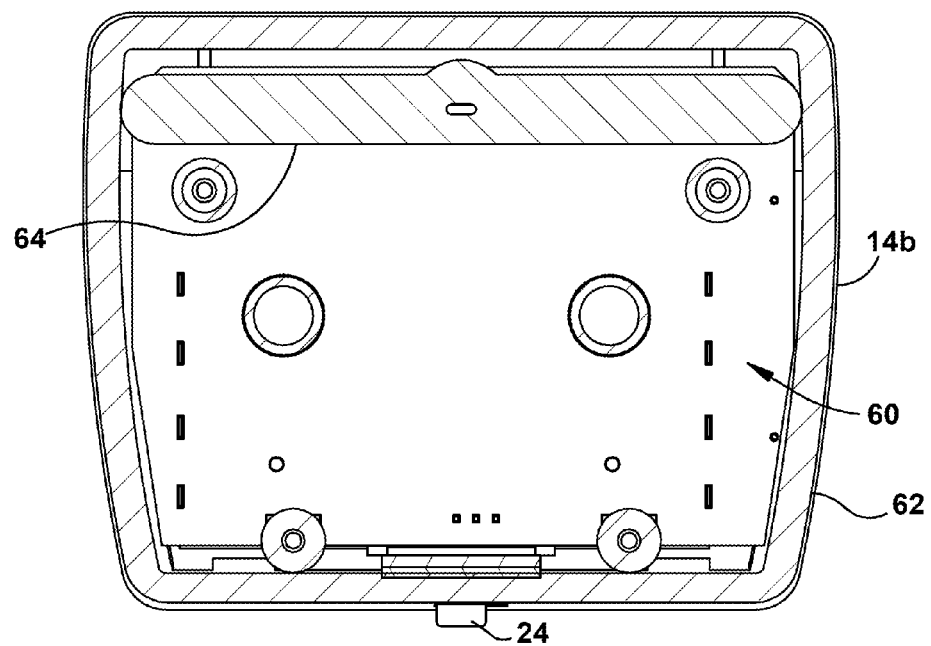
FIG. 10 is a right side perspective view of a portion of the sensor assembly of the tailgate sensor assembly of FIG. 1.
Figure 11:
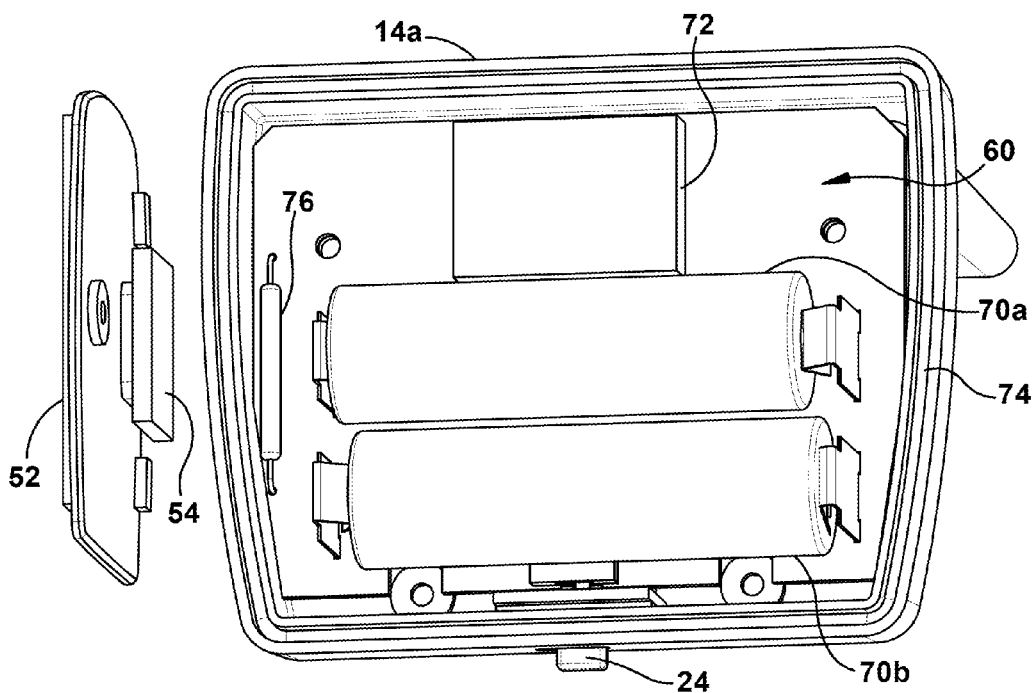
FIG. 11 is a left view of another portion of the sensor assembly of the tailgate sensor assembly of FIG. 1.

The sensor assembly is constructed and arranged to determine whether the tailgate gate is either open or closed, and when the tailgate is open, electrically signal the LED assembly to illuminate a warning light to advise the driver. Referring now to FIGS. 10 and 11, internal components of the sensor assembly 14 are shown with certain housing components removed. FIG. 10 is a right side perspective view of the sensor assembly 14 with the bottom housing 14a removed, and FIG. 11 is a left view of the sensor assembly 14 shown with the top housing 14b and the battery housing 14c removed. In FIG. 10, a printed circuit board assembly 60 is shown positioned within the boundaries of the top housing 14b. An o-ring seal 62 and a bar seal 64 promote a sealed connection with portions of the bottom housing 14a. In FIG. 11, two batteries 70a, 70b are shown within the boundaries of the bottom housing 14a. An o-ring seal 62 surrounds the circumference of the bottom housing and promotes a sealed connection with the top housing 14b. A sensor module 72 is mounted to the printed circuit board assembly 60. The components shown in FIGS. 10 and 11 may vary in the practice of the invention, such as for example, in type, number, position and combination.

As discussed, the tailgate sensor assembly 10 detects whether a tailgate of a pickup truck is open or closed. FIG. 11 shows certain components of the sensor assembly 14 and magnet assembly 16 with the tailgate in a closed position. In this closed position, a relay 76 secured to the printed circuit board assembly 60 is positioned within a functional proximity to the magnet 54 of the magnet assembly 16. The distance and relative positioning between the magnet and the relay can vary in the practice of this invention.

Figure 12:
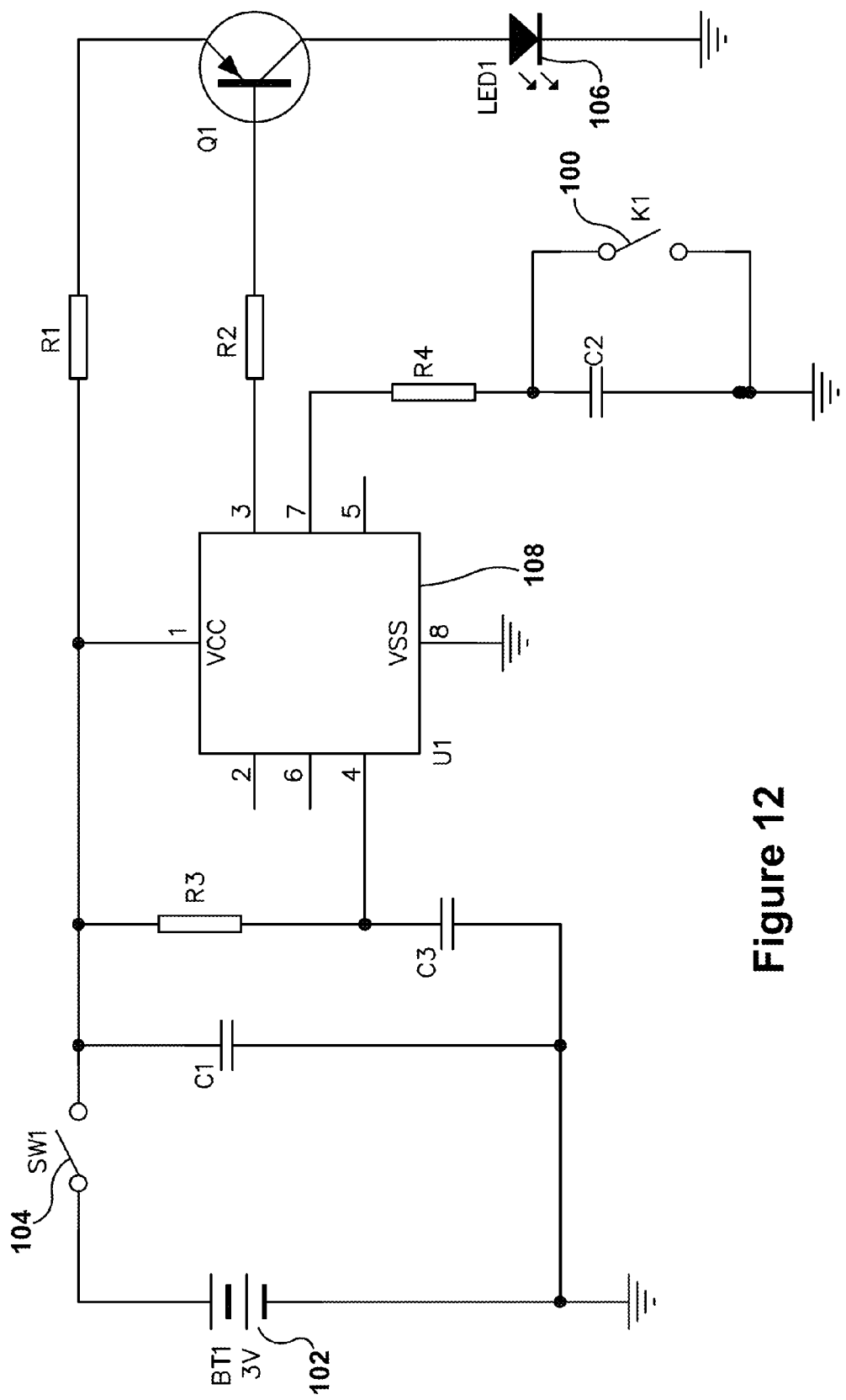
FIG. 12 is a schematic diagram, showing a circuit of an exemplary embodiment of the invention.

Referring now to FIG. 12, a schematic diagram of a circuit of an exemplary embodiment of the invention is shown. The schematic diagram includes various electronic components forming at least part of an exemplary circuit. The circuit shown is for example only. It should be apparent to one skilled in the art that other circuit patterns could be used in the practice of this invention, such as for example, circuit patterns having additional, fewer or different components, components in different sequence or placement, and components of different electrical specification.

A relay (K1) 100 is closed by an operator moving a magnet, such as for example, magnet 54, within functional proximity of the relay, i.e., by moving the tailgate to a closed position. The functional proximity will vary depending on the strength of the magnet and the specifications of the relay. It would be understood by one skilled in the art that the functional proximity will not dangerously exceed a distance between the magnet and the relay when the tailgate is in a closed position. Any suitable relay may be used, such as for example, a Reed switch. A battery (BT1) 102 is included in the circuit and may be of any sufficient voltage, such as for example, 3 volts. A manually operated power switch (SW1) 104 allows a user to turn the tailgate sensor system on and off as desired. As shown, one termination of the circuit is a light emitting diode (LED1) 106. The reminder of the circuit includes an integrated circuit assembly (U1) 108, a transistor (Q1), various capacitors (C1, C2, C3) and various resistors (R1, R2, R3, R4). The combination, number, specification and placement of all parts of the circuit are for example only and can vary in the practice of the invention.

In operation on the exemplary embodiment of FIG. 12, the relay (K1) will open when the tailgate is open, i.e., the magnet is not within functional proximity of the relay, the integrated circuit assembly 108 will turn on the transistor Q1 and the LED 106 is turned on. In another embodiment, the relay (K1) will close when the tailgate is open, i.e., the magnet is not within functional proximity of the relay, the integrated circuit assembly 108 will turn on the transistor Q1 and the LED 106 is turned on.

FIG. 13 is a front perspective view of another exemplary embodiment of the invention. A tailgate sensor system 110 includes an LED assembly 112, a sensor assembly 114 and a magnet assembly 116. The sensor assembly 114 is electrically and mechanically joined to the LED assembly 112 by a connector 118. The connector is flexible, such as for example, a ribbon cable, and can be manipulated by a user at installation into a variety of shapes. For example, the connector 118 can be manipulated into a U shape, such that the sensor assembly 114 and the LED assembly 112 may be fixed to opposing sides of a side rail at locations below the top surface of the side rail. It should be apparent to one skilled in the art that various connector types and styles may be used in the practice of this invention.

Adjacent surfaces of the sensor assembly 114 and the magnet assembly 116 are shaped to promote alignment. As shown in FIGS. 14 and 15, the outer surface 120 of the magnet assembly 116 is concave-shaped to correspond with the convex-shaped outer surface 122 of the sensor assembly 114. In operation of the tailgate sensor system 110, the surfaces 120, 122 may be contiguous when the tailgate is closed, or may be sufficiently adjacent to manipulate the relay in the sensor assembly 114.

The present invention can be practice using a sensor assembly disposed in various locations in the pickup truck. As discussed herein, the sensor assembly can be disposed on the upper inside wall of a side rail on the driver's side of the pickup truck. In another embodiment, the sensor assembly can be positioned adjacent, on, or within a truck bed cover or truck bed cover assembly. For example, the sensor assembly can be fixed to a frame of a truck bed cover assembly.

Figure 16A:
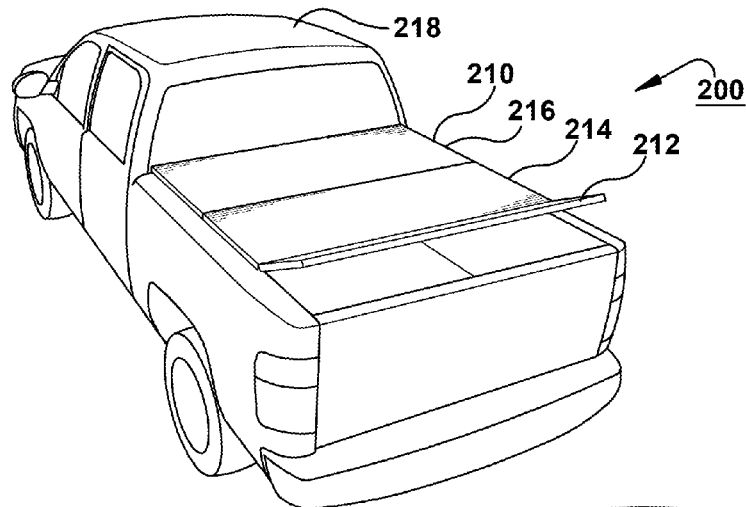
FIG. 16a is rear perspective view of a pickup truck having a folding truck bed cover, shown with the truck cover partially closed.
Figure 16B:
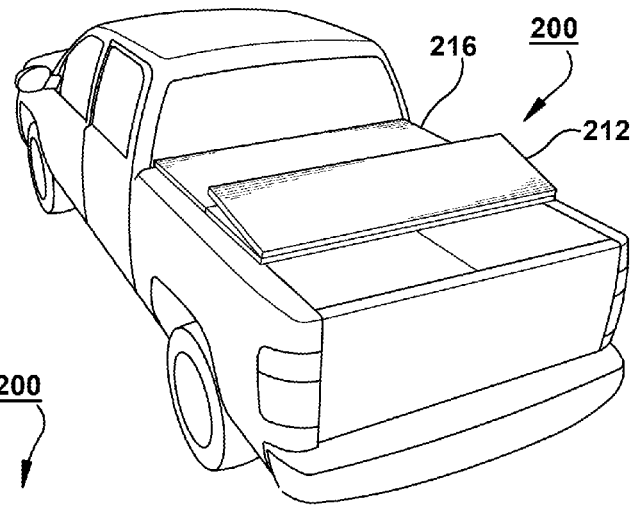
FIG. 16b is rear perspective view of the pickup truck of FIG. 16a, shown with the truck cover partially open.
Figure 16C:
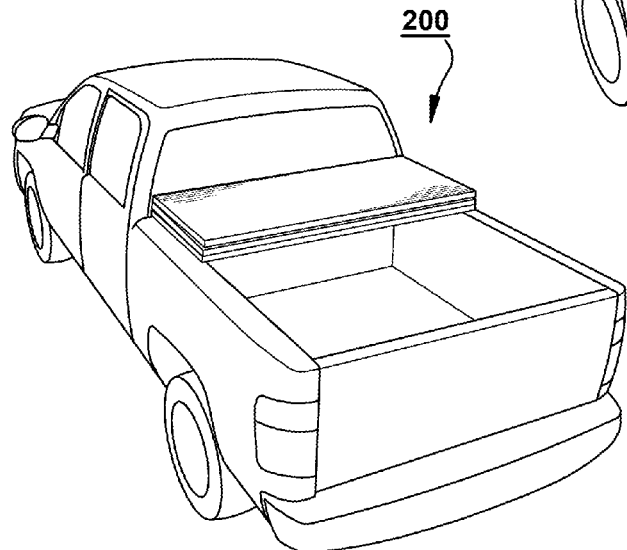
FIG. 16c is rear perspective view of the pickup truck of FIG. 16a, shown with the truck cover opened.

An exemplary embodiment of the invention is illustrated in FIGS. 16a-21. The invention is not limited to the embodiments illustrated in FIGS. 1-15 and discussed in the specification. Referring now to FIGS. 16a-16c, a pickup truck having a truck bed cover assembly is shown. The truck 200 has a folding cover 210 with a plurality of sections, such as for example, a tri-fold cover. As shown, the cover has a first section 212, disposed at the rear of the bed, a second section 214, disposed at the center of the bed, and a third section 216, disposed at the front of the bed and closest to the cab 218 of the truck. The cover 210 is shown in various stages between an open position and a closed position in FIGS. 16a-16c.

Figure 17:
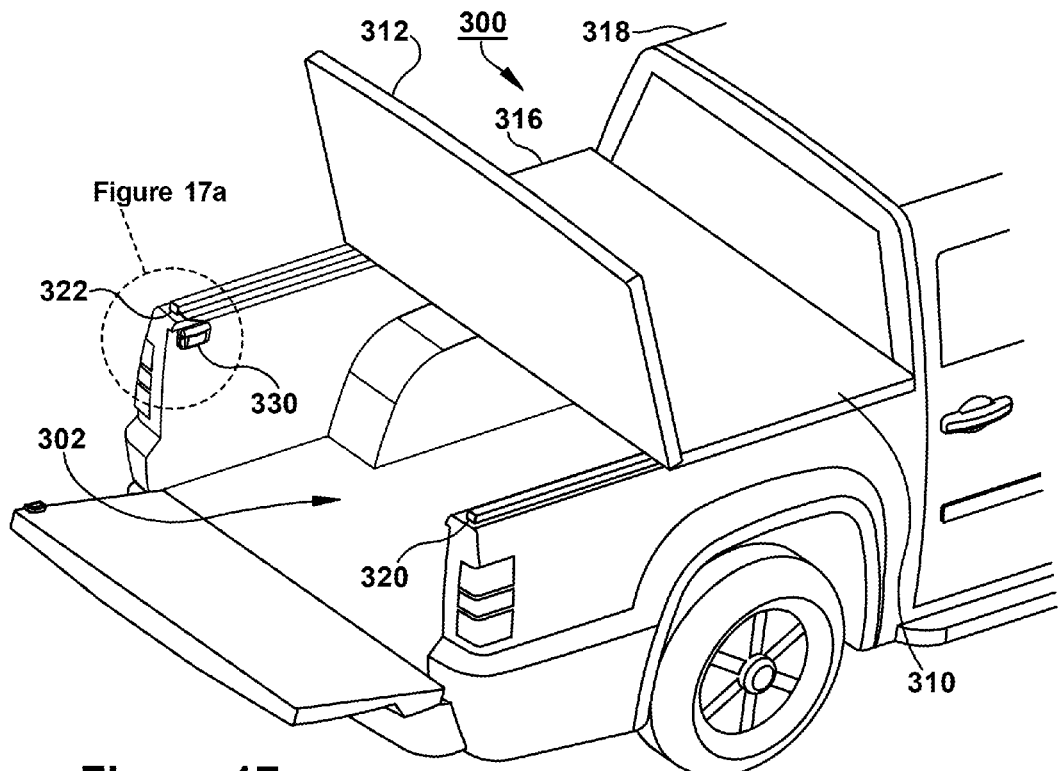
FIG. 17 is a right perspective view of a pickup truck having a folding truck bed cover, showing another exemplary embodiment of the invention.
Figure 18:
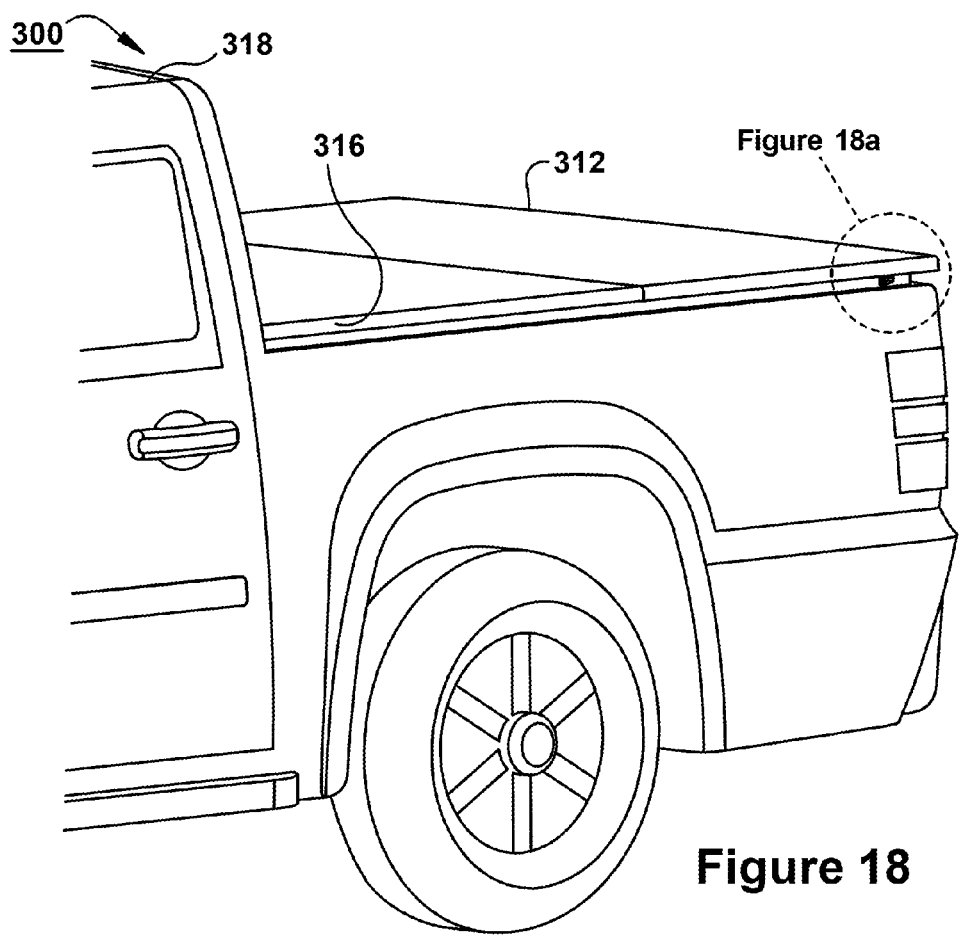
FIG. 18 is a left perspective view of the pickup truck of FIG. 17, shown with the truck bed cover closed.

Another exemplary embodiment of the invention is shown in FIGS. 17 and 18. A truck 300 has a folding cover installed over the cargo bed 302. The cover is shown partially open in FIG. 17 and is shown closed in FIG. 18. The cover assembly 310 specifically is a bi-fold cover having two sections, a rear section 312 and a front section 316, and a right frame 320 and a left frame 322. Frames are installed upon which the cover is rested, is fixed, or is removably engaged when closed. The frames 320, 322 are mounted on a top surface of the side rails of the truck. The truck includes a sensor assembly 330 which, for example, may have structure and properties similar to a sensor assembly discussed herein.

Figure 17A:
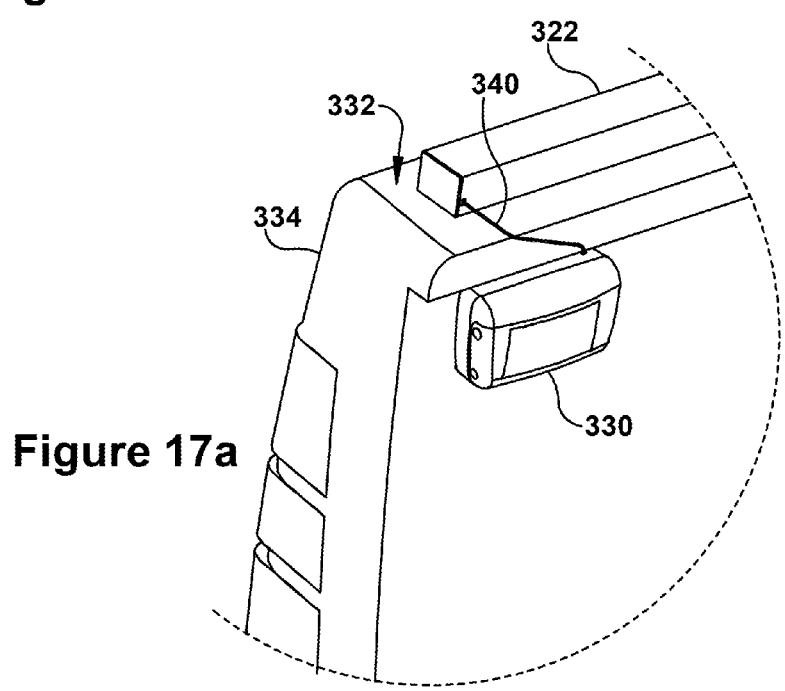
FIG. 17a is an enlarged view of the area designated in FIG. 17.
Figure 18A:
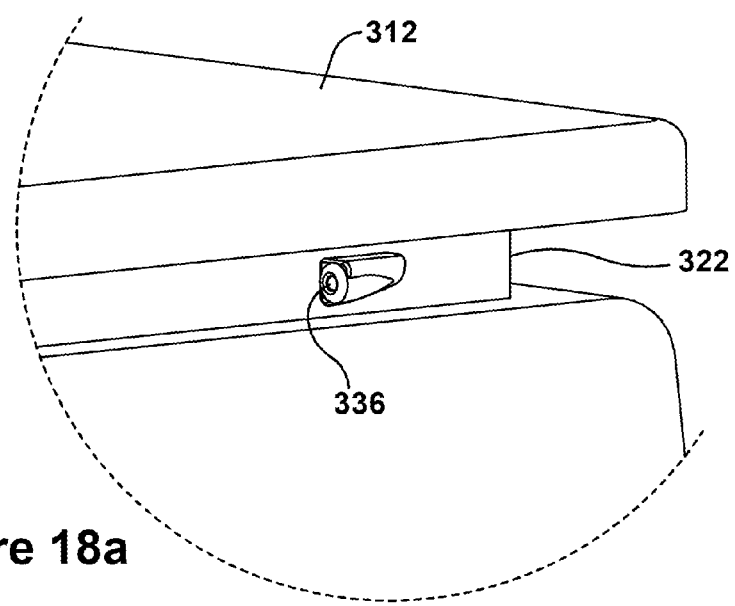
FIG. 18a is an enlarged view of the area designated in FIG. 18.
Figure 19:
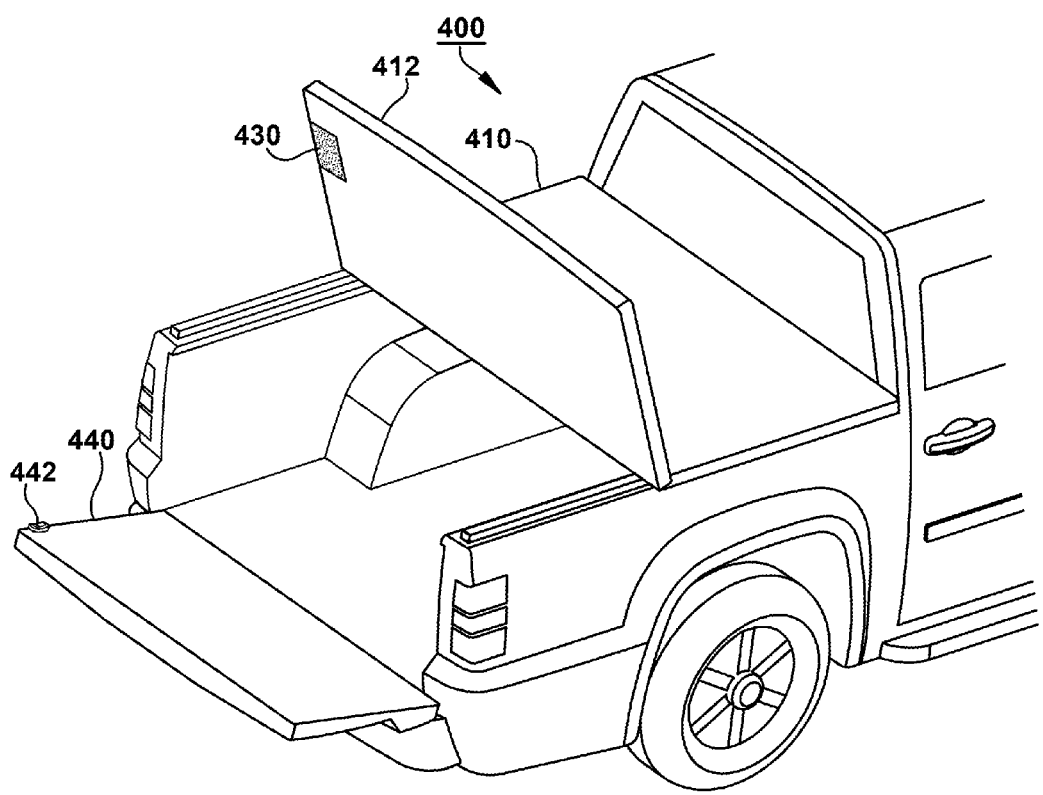
FIG. 19 is a right perspective view of a pickup truck having a folding truck bed cover, showing another exemplary embodiment of the invention.

In the enlarged view of FIG. 17a, an exemplary mounting position of the sensor assembly 330 is illustrated. On the driver's side of the truck, the left frame 322 of the truck bed cover assembly is fixed on a top surface 332 of the left side rail 334. As shown, the sensor assembly 330 is mounted to an inside surface of the left rail 334. As discussed herein, a magnet assembly 442 may be mounted on the top inside surface of the tailgate 440 (as seen in FIG. 19). An electrical connector 340, such as for example, a wire, is positioned between the frame 322 and the top surface 332. The connector provides a signal path from the sensor assembly 330 to an LED assembly 336, as shown in FIGS. 18 and 18a. In another embodiment, the connector may be positioned through the frame 322, or above the frame 322.

Referring to FIG. 19, a right perspective view of a pickup truck is shown having another exemplary embodiment of the invention. As shown, the pickup truck 400 includes a bi-fold truck cover 410. A sensor assembly 430 is mounted to the underside of a rear section 412 of the truck cover. In this orientation, the LED warning light will not illuminate if the rear section and the tailgate are each in the closed position.

Figure 20A:
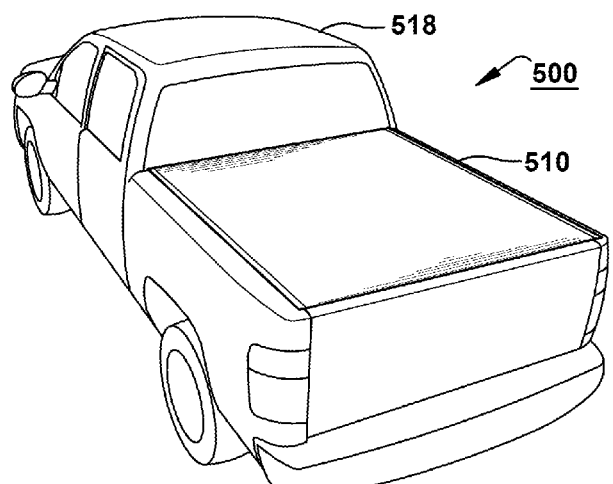
FIG. 20a is rear perspective view of a pickup truck having a rolling truck bed cover, shown with the truck cover closed.
Figure 20B:
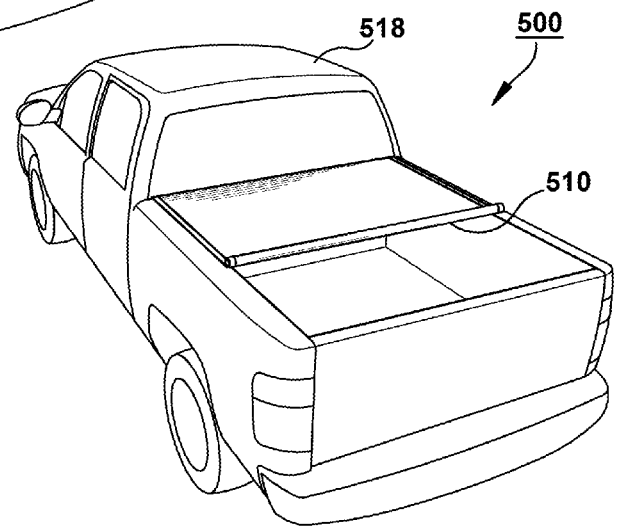
FIG. 20b is rear perspective view of the pickup truck of FIG. 20a, shown with the truck cover partially open.
Figure 20C:
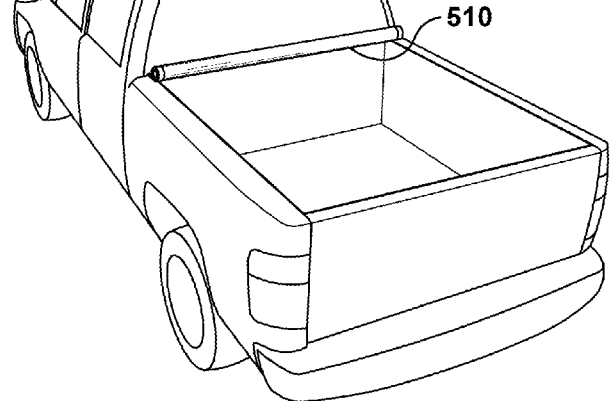
FIG. 20c is rear perspective view of the pickup truck of FIG. 20a, shown with the truck cover open.

Referring now to FIGS. 20a-20c, a pickup truck having a rolling truck bed cover is shown. The truck 500 has a rolling cover 510 which stretches to the tailgate when closed, as shown in FIG. 20a, and rolls to a stored and open position adjacent the cab 518, as shown in FIGS. 20c. The cover 510 is shown in partially open position between a stored and open position and a closed position in FIG. 20b.

Figure 21:
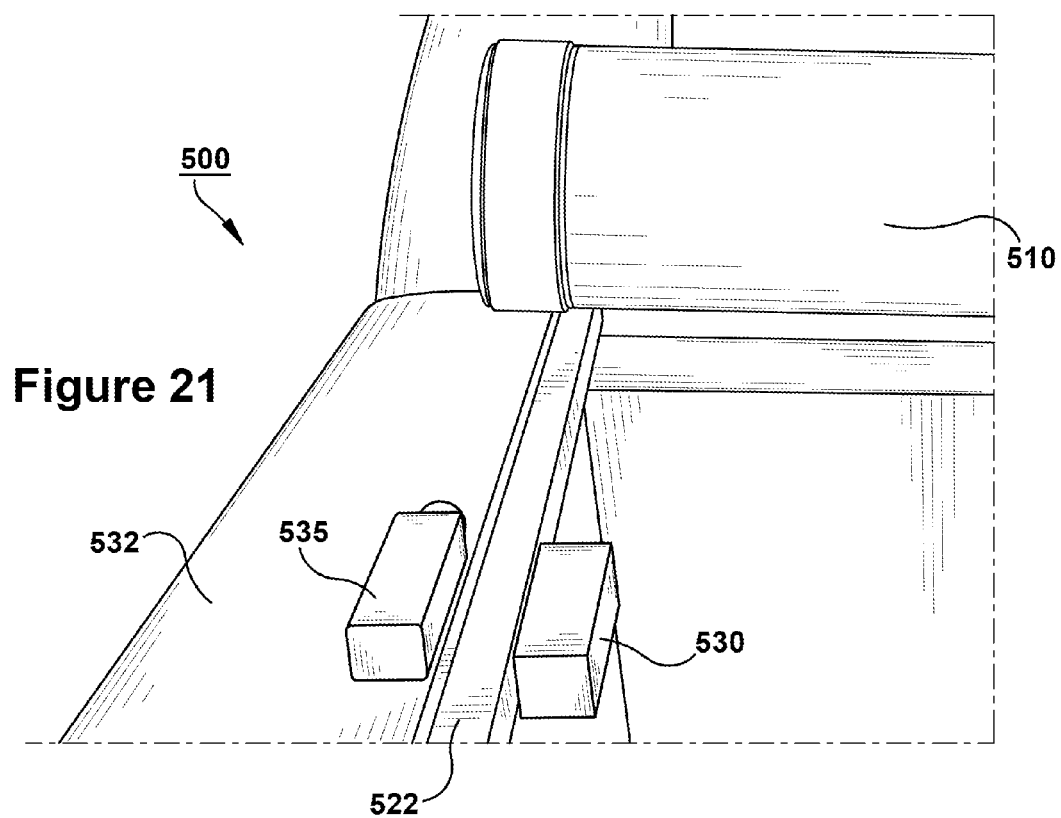
FIG. 21 is a rear perspective view of a pickup truck having a rolling truck bed cover, showing another exemplary embodiment of the invention.

Another exemplary embodiment of the invention is shown in FIG. 21. In a rear perspective view, a portion of the pickup truck 500 is shown with the cover 510 in a stored and open position. The sensor assembly 530 is mounted directly to the left side frame 522 and in an opposing position as the LED assembly 535, relative the frame 522. The sensor assembly and LED assembly are positioned in an arrangement to be electrically communicative, such as by a wire, a relay, or a wireless signal. The sensor assembly is mounted in an arrangement to be in magnetic communication with a magnet assembly when the tailgate is in a closed position.

It should be apparent to one skilled in the art that other mounting locations for the magnet assembly, the sensor assembly, and the LED assembly not discussed specifically herein are possible in the practice of this invention.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasable or removably, connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

Further, while various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A tailgate sensor system for providing a warning signal to a driver of a pickup truck, the system comprising:
   a detector mounted on an exterior of a pickup truck;
   an activator mounted on and moveable with a tailgate of the pickup truck; and
   a signal generator in communication with the detector;
   wherein the activator is positioned relative the detector when the tailgate is in at least a partially open position, such that the detector generates a signal receivable by the signal generator and the signal generator provides a warning signal to the driver;
   wherein the detector is mounted on a truck cover assembly of the pickup truck.

2. The tailgate sensor system of claim 1, wherein a signal by the activator completes an electrical circuit in the detector when the tailgate is in a closed position, and the electrical circuit in the detector is open when the tailgate is in at least a partially open position.

3. The tailgate sensor system of claim 1, wherein the warning signal comprises a visual signal.

4. The tailgate sensor system of claim 3, wherein the warning signal comprises a flashing light.

5. The tailgate sensor system of claim 1, wherein the warning signal comprises an audible signal.

6. A tailgate sensor system for providing a warning signal to a driver of a pickup truck, the system comprising:
   a detector attached to a pickup truck;
   an activator attached to and moveable with a tailgate of the pickup truck between a detectable position relative to the detector and an undetectable position relative to the detector; and
   a signal generator in communication with the detector;
   wherein, with the activator in an undetectable position, the detector transmits a signal to the signal generator, whereby the signal generator provides a warning signal to the driver;
   wherein the detector is attached to a truck bed cover assembly.

7. The tailgate sensor system of claim 6, wherein the detector includes an electrical circuit, wherein a switch in the electrical circuit is operable when the activator is in a functional proximity to the detector.

8. The tailgate sensor system of claim 6, wherein the detector is a sensor assembly having an electrical circuit and a switch.

9. The tailgate sensor system of claim 6, wherein the activator comprises a magnet.

10. The tailgate sensor system of claim 6, wherein the signal generator comprises an LED.

11. The tailgate sensor system of claim 6, wherein the activator is removably fixed to the tailgate of the pickup by an adhesive pad.

12. The tailgate sensor system of claim 6, wherein the signal generator is electrically connected to the detector.

13. The tailgate sensor system of claim 6, wherein the signal generator is mechanically connected to the detector.

14. The tailgate sensor system of claim 6, wherein the signal generator is in wireless communication with the detector.

15. The tailgate sensor system of claim 6, wherein the signal generator is positioned in a line of sight of a driver of the pickup truck.

16. The tailgate sensor system of claim 6, further including a user-operable switch to disable the signal generator.

* * * * *